United States Patent
Miyamoto

(10) Patent No.: US 9,621,054 B2
(45) Date of Patent: Apr. 11, 2017

(54) POWER SUPPLY CIRCUIT, ELECTRONIC PROCESSING APPARATUS, AND POWER SUPPLY METHOD

(71) Applicant: FUJITSU LIMITED, Kawasaki-shi, Kanagawa (JP)

(72) Inventor: Toshihiro Miyamoto, Machida (JP)

(73) Assignee: FUJITSU LIMITED, Kawasaki (JP)

( * ) Notice: Subject to any disclaimer, the term of this patent is extended or adjusted under 35 U.S.C. 154(b) by 141 days.

(21) Appl. No.: 14/604,463

(22) Filed: Jan. 23, 2015

(65) Prior Publication Data

US 2015/0131335 A1  May 14, 2015

Related U.S. Application Data

(63) Continuation of application No. PCT/JP2012/069984, filed on Aug. 6, 2012.

(51) Int. Cl.
  *H02M 3/335* (2006.01)
  *H02M 7/00* (2006.01)
  *H02M 7/757* (2006.01)
  *H02M 1/32* (2007.01)

(52) U.S. Cl.
  CPC .. *H02M 3/33507* (2013.01); *H02M 2001/327* (2013.01)

(58) Field of Classification Search
  CPC .... G05F 1/462; G05F 1/463; H02M 3/33507; H02M 3/33523; H02M 7/1555; H02M 7/1557
  USPC ..... 323/246, 268, 369; 363/21.12–21.18, 73, 363/78–80, 142
  See application file for complete search history.

(56) References Cited

U.S. PATENT DOCUMENTS

| | | | | |
|---|---|---|---|---|
| 5,408,401 A | * | 4/1995 | Miyazaki | G05F 1/567 318/471 |
| 5,942,882 A | * | 8/1999 | Ohta | G03G 15/2003 323/282 |
| 2002/0015316 A1 | | 2/2002 | Nakazawa et al. | |
| 2004/0164714 A1 | | 8/2004 | Hayashi | |
| 2006/0056205 A1 | * | 3/2006 | Kyono | H02M 1/32 363/15 |

(Continued)

FOREIGN PATENT DOCUMENTS

| JP | 2000-010647 A | 1/2000 |
|---|---|---|
| JP | 2001-075659 A | 3/2001 |

(Continued)

OTHER PUBLICATIONS

Japanese Office Action dated Jan. 5, 2016 for corresponding Japanese Patent Application No. 2014-529172. Translation of the relevant part, p. 1, line 20-p. 2, line 6, p. 2, lines 10-15, p. 2, lines 19-31 and p. 3, lines 1-6 of the Office Action.

(Continued)

*Primary Examiner* — Adolf Berhane
*Assistant Examiner* — Gary Nash
(74) *Attorney, Agent, or Firm* — Maschoff Brennan

(57) ABSTRACT

A power supply circuit includes: an environment detecting circuit which detects an installation environment; and a voltage control circuit which makes a report of a power supply capability by performing fluctuation control of an output voltage in response to detection information of the environment detecting circuit.

12 Claims, 11 Drawing Sheets

(56) References Cited

U.S. PATENT DOCUMENTS

| 2010/0165667 A1* | 7/2010 | Artusi | H02M 1/4225 |
| | | | 363/21.01 |
| 2010/0208502 A1* | 8/2010 | Horii | H02M 3/33507 |
| | | | 363/131 |

FOREIGN PATENT DOCUMENTS

| JP | 2003-79139 | | 3/2003 |
| JP | 2004-260911 | | 9/2004 |
| JP | 2007-295681 | A | 11/2007 |
| JP | 2009-106010 | A | 5/2009 |
| JP | 2009-225610 | | 10/2009 |
| JP | 2010-146966 | | 7/2010 |

OTHER PUBLICATIONS

Written Opinion and International Search Report corresponding to PCT/JP2012/069987 mailed on Oct. 30, 2012.
Japanese Office Action dated Sep. 15, 2015 for corresponding Japanese Patent Application No. 2014-529172. Translation of the relevant part, p. 1, line 24-p. 2, line 5 and p. 2 lines 10-15 and 19-31 of the Office Action.

* cited by examiner

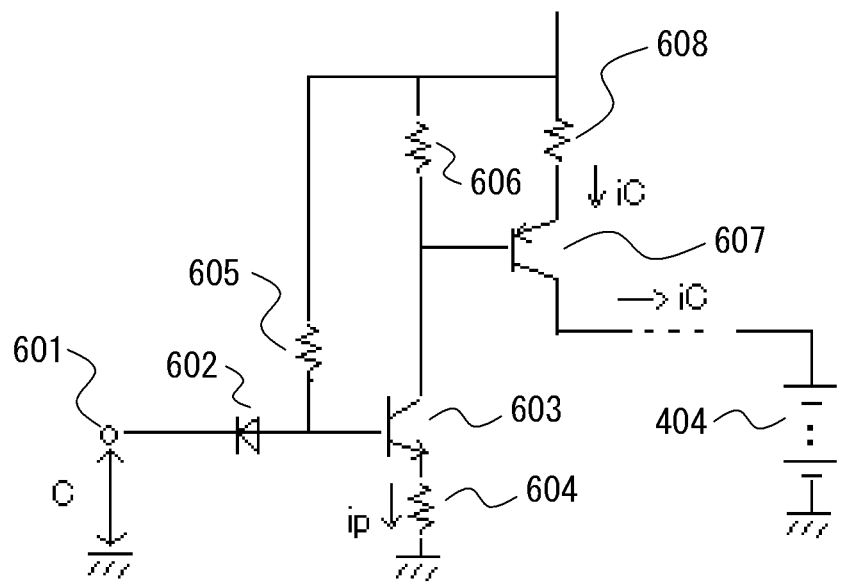
F I G. 6

| POWER SUPPLY VOLTAGE V | CURRENT CONSUMPTION i | AREA |
|---|---|---|
| 19 VOLTS | 2000 mA | A |
| 18 VOLTS | 1500 mA | |
| 17 VOLTS | 1000 mA | |
| 16 VOLTS | OPERATION-ONLY | B |
| 15 VOLTS OR BELOW | USAGE PROHIBITED | C |

F I G. 9

POWER SUPPLY CIRCUIT, ELECTRONIC PROCESSING APPARATUS, AND POWER SUPPLY METHOD

CROSS-REFERENCE TO RELATED APPLICATIONS

This application is a continuation application of International Application PCT/JP2012/069984, filed on Aug. 6, 2012, and designated the U.S., the entire contents of which are incorporated herein by reference.

FIELD

The embodiments described herein relate to a power supply circuit, an electronic processing apparatus which uses a power supply circuit, and a power supply method.

BACKGROUND

As a power supply for a laptop personal computer (hereinafter, referred to as a "PC") and other information processing apparatuses, a power supply circuit that obtains a direct current (DC) output from an alternating current (AC) adapter power supply and that supplies power to the information processing apparatus has been used.

The common AC adapter used for PCs today takes the form of a constant voltage power supply circuit, and its output is kept constant with respect to changes in the AC input. Meanwhile, as devices become smaller, a smaller size has become required for the AC adapter as well. In addition, in regard to its output power, there has been a demand for a large-capacity output together with power-saving efforts, along with improvements in the performance and functions of information processing apparatuses. In such a situation, thermal design of the AC adapter involves a greater difficulty today.

For a conventional AC adapter, a prescribed constant output power is required both when environmental conditions are at the worst or when they are not. The difficulty in design is how to make the maximum power that may be output under the worst environmental conditions the rated power, and how to derive it.

Incidentally, our country experienced the unprecedented Great East Japan Earthquake, which involved not only earthquakes and tsunamis but also the destruction of nuclear power plants, as well as secondary disasters such as the radiation leakage and evacuation from designated zones, leading to a limited power supply capability due to the destruction of the nuclear power plants.

A bitter lesson learned from these experiences is that the power supply is not inexhaustible, and that continued enhancement of low-cost supply of power so as to respond to the demand without considering the means is difficult now. Therefore, it is necessary for industries that provide electronic devices to provide an apparatus with flexibility in response to the environment in which it has to operate by effectively using what little power is available.

In response to such a demand, a technique is known in which a power supply control circuit that controls the output of a power supply is configured to be equipped with a setting unit that performs variable setting of the maximum rated output according to input temperature information (the technique described in the Document 1 for example).

However, conventionally, there has been a problem wherein it is impossible to notify the device of the power-receiving side of restrictions due to environmental conditions in a power apparatus, and it is impossible to perform cooperative operations between the power apparatus and the receiving device according to the environmental conditions.

Document 1: Japanese Laid-open Patent Publication No. 2001-75659.

SUMMARY

According to an aspect of the embodiments, a power supply circuit includes: an environment detecting circuit which detects an installation environment; and a voltage control circuit which makes a report of a power supply capability by performing fluctuation control of an output voltage in response to detection information of the environment detecting circuit.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF THE DRAWINGS

FIG. 6 is a detailed circuit configuration diagram of a charging circuit;

FIG. 9 presents a data configuration example of a V/I table;

DESCRIPTION OF EMBODIMENTS

Hereinafter, embodiments of the present invention are explained in detail with reference to the drawings.

Figure 1:
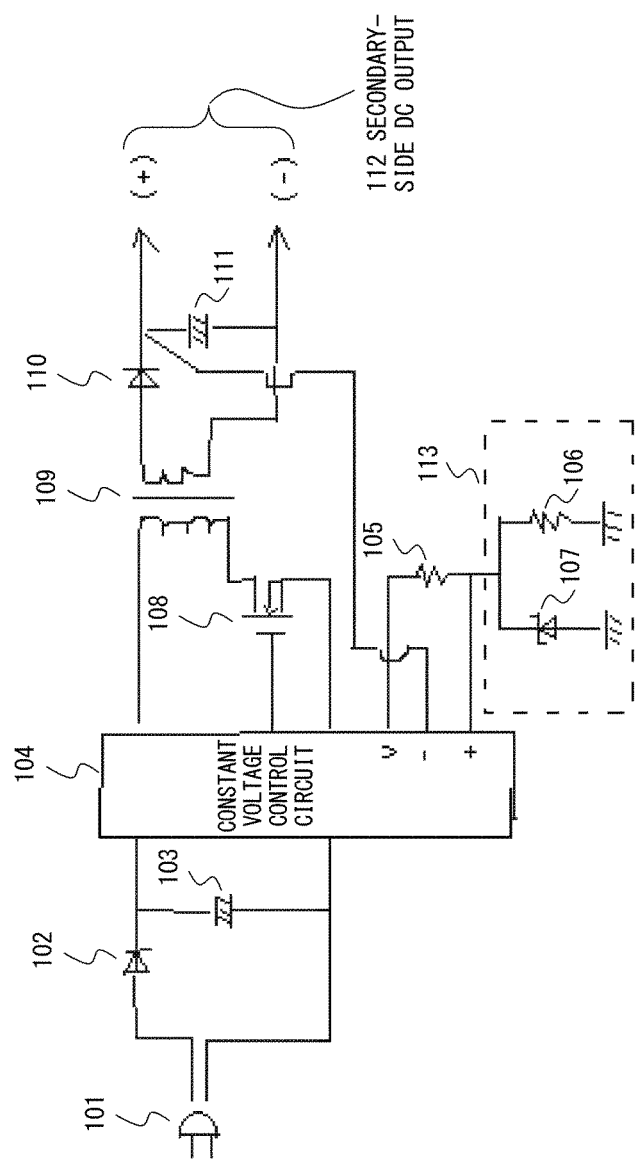
FIG. 1 is a configuration diagram of a first embodiment of a power supply circuit.

FIG. 1 is a configuration diagram of a first embodiment of a power supply circuit. The first embodiment is an AC adapter which detects the temperature of a power supply circuit as the installation environment and which makes a report of the power supply capability to the receiving side of the power by performing fluctuation control of the output voltage in response to the detection information.

An AC adapter in FIG. 1 receives an input 101 of AC 100V, and outputs a secondary-side DC output 112 which may be up to 19V (volts).

A diode 102 and a capacitor 103 constitute a primary-side rectifying/smoothing circuit. A flyback transformer (hereinafter, simply referred to as a "transformer") 109 converts the voltage of the primary side to the secondary-side DC output 112 of 19V. An N-channel field effect transistor (FET) 108 is a switching element for turning ON or OFF the DC voltage obtained by the diode 102 and the capacitor 103 and for making it into AC and giving it to the flyback transformer 109. The flyback transformer 109 receives an input of a pulse from the N-channel FET 108 and generates positive and negative output voltage by mutual induction. The output voltage is determined according to the input voltage, the ratio of the number of windings of the flyback transformer 109, and the duty ratio of an ON/OFF of the N-channel FET.

A constant voltage control circuit 104 has a function of receiving the feedback voltage of the secondary-side DC output 112 and of outputting a PWM (Pulse Width Modulation) pulse to the N-channel FET 108, to control the voltage of the secondary-side DC output 112. The v terminal of the constant voltage control circuit 104 is a comparison voltage output, which is an output voltage for obtaining a +terminal voltage to input the reference voltage for a voltage comparator circuit provided in it.

A diode 110 and a capacitor 111 constitute a secondary-side rectifying/smoothing circuit. This is a circuit for rectifying the output voltage of the flyback transformer 109 to obtain the secondary-side DC output 112 of 19V (normal).

Numeral 105 is a voltage dividing resistor and numeral 106 is a thermistor whose resistance value changes according to the temperature, and these constitute a voltage dividing circuit for the reference output voltage of the constant voltage control circuit 104. One end of the voltage dividing resistor 105 is connected to the output terminal of a prescribed reference voltage v of the constant voltage control circuit 104, and the other end of the voltage dividing resistor 105 and one end of the resistor 106 are connected, and the other end of the resistor 106 is grounded. Numeral 107 is a Zener diode that is connected in parallel to the resistor 106, and one end of it is grounded and the other end is connected to the connection point of the voltage dividing resistor 105 and the resistor 106. The Zener diode 107 is an element for clamping the voltage of the voltage dividing circuit composed of the voltage dividing resistor 105 and the thermistor 106. The circuit part composed of the thermistor 106 and the Zener diode 107 constitutes a temperature monitoring circuit 113, which may constitute an environment detecting circuit together with the voltage dividing resistor 105. The connection point of the temperature monitoring circuit 113 and the voltage dividing resistor 105 is connected to the +input of a comparator circuit in the constant voltage control circuit 104, which is not specifically illustrated in FIG. 1, to supply the controlled reference voltage. It is assumed that a temperature characteristic of the thermistor 106 exhibits a negative temperature characteristic, and when the temperature rises, the resistor value decreases. From these characteristics, when the temperature is kept equal to or lower than a prescribed temperature boundary, a constant voltage clamped by the voltage of the Zener diode 107 is, from the part at which the voltage dividing resistor 105 and the temperature monitoring circuit 113 are connected, provided as the controlled reference voltage to the +input of the comparator circuit in the constant voltage control circuit 104. Meanwhile, when the temperature rises to or higher than the prescribed temperature boundary, the divided voltage of the voltage dividing resistor 105 and the thermistor 106 falls below the Zener voltage of the Zener diode 107, and it is provided as the controlled reference voltage to the +input of the comparator circuit in the constant voltage control circuit 104. The controlled reference voltage decreases in a manner corresponding to the thermistor 106 whose resistor value decreases in response to a temperature increase.

Meanwhile, the secondary-side DC output 112 is connected to an input of the comparator circuit in the constant voltage control circuit 104 not specifically illustrated in FIG. 1 and it is controlled by negative feedback control in the comparator circuit.

Figure 2:
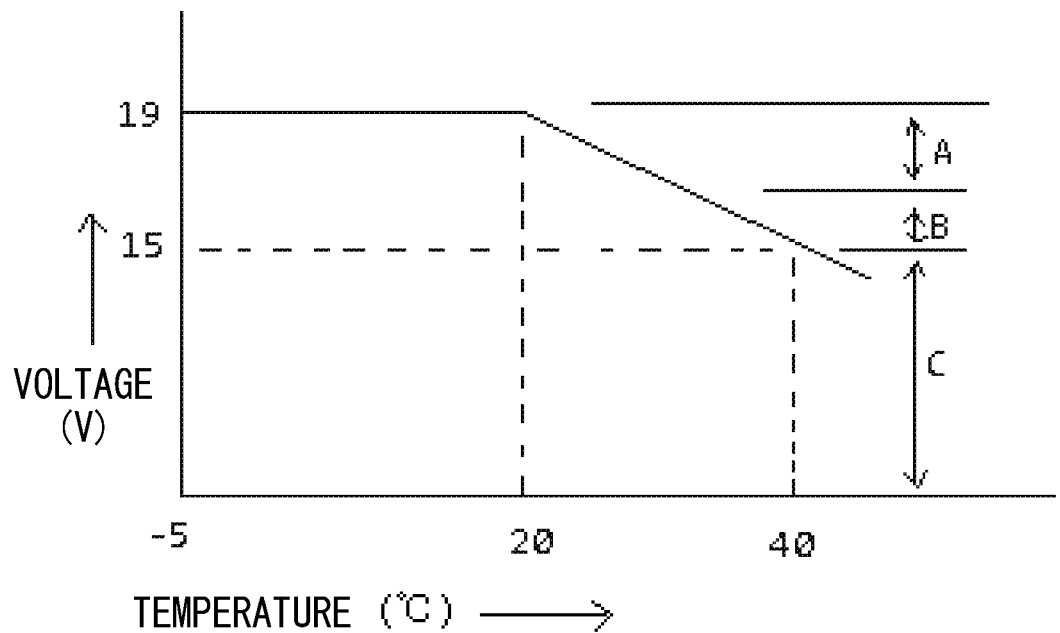
FIG. 2 is an operation characteristic diagram of the first embodiment.

FIG. 2 is an operation characteristic diagram of the first embodiment. As a result of the negative feedback control between the +input and −input in the comparator circuit mentioned above in the constant voltage control circuit 104, the power supply circuit in FIG. 1 outputs a voltage that is analogous to the temperature change of the comparison voltage which is input to the +input as the secondary-side DC output 112. For example, when the environmental temperature of the power supply circuit is between −5° C. and 20° C., the voltage which is output by the voltage dividing circuit composed of the voltage dividing resistor 105 and the thermistor 106 in FIG. 1 is maintained at a constant voltage clamped by the voltage of the Zener diode 107. Therefore, the secondary-side DC output 112 of the power supply circuit in FIG. 1 is maintained at a fixed voltage of 19V according to the negative feedback control between this fixed voltage and the secondary-side DC output 112 of the power-supply circuit to the −input. When the environmental temperature of the power supply circuit exceeds 20° C., the divided voltage falls below the Zener voltage of the Zener diode 107 due to the change in the resistor value of the thermistor 106 in FIG. 1, and the output voltage of the voltage dividing circuit decreases. Therefore, the secondary-side DC output 112 of the power supply circuit in FIG. 1 becomes a voltage that linearly decreases from 19V along with the temperature increase, according to the negative feedback control between this voltage and the secondary-side DC output 112 to −input. In the present embodiment, the secondary-side DC output 112, which is variable as described above, is reported to the apparatus of the receiving side of the power as a power-supply capability report. Accordingly, at a receiving apparatus side, it becomes possible to control the current value for each of the areas such as A, B and C illustrated in FIG. 2 according to the temperature of the power supply circuit, so as to control the power consumption.

In designing a power supply circuit, the environmental conditions of the temperature is very important, and it determines the parts and the structure of the housing to be used. Electrical parts have a rated temperature, and in a power supply circuit that handles a larger power, the loss in an electrical part is also large, and self-heating accompanies this. The heat generation due to the self-heating and the external environmental temperature determine the temperature of the electrical part, and when the external environmental temperature is low, power loss may be increased accordingly, and it becomes possible to output a large amount of power. In the conventional technique, regardless of the external environmental temperature, a setting of a limit on the output power according to this temperature has not been performed. In the power supply system according to the present embodiment, according to the temperature environment, it is made possible to provide a notification of an output of a low-output power at a high temperature and an output of a high-output power at a low temperature, and it becomes possible to realize operations of the device at the receiving side of the power that are appropriate for the difference in the power.

Figure 3:
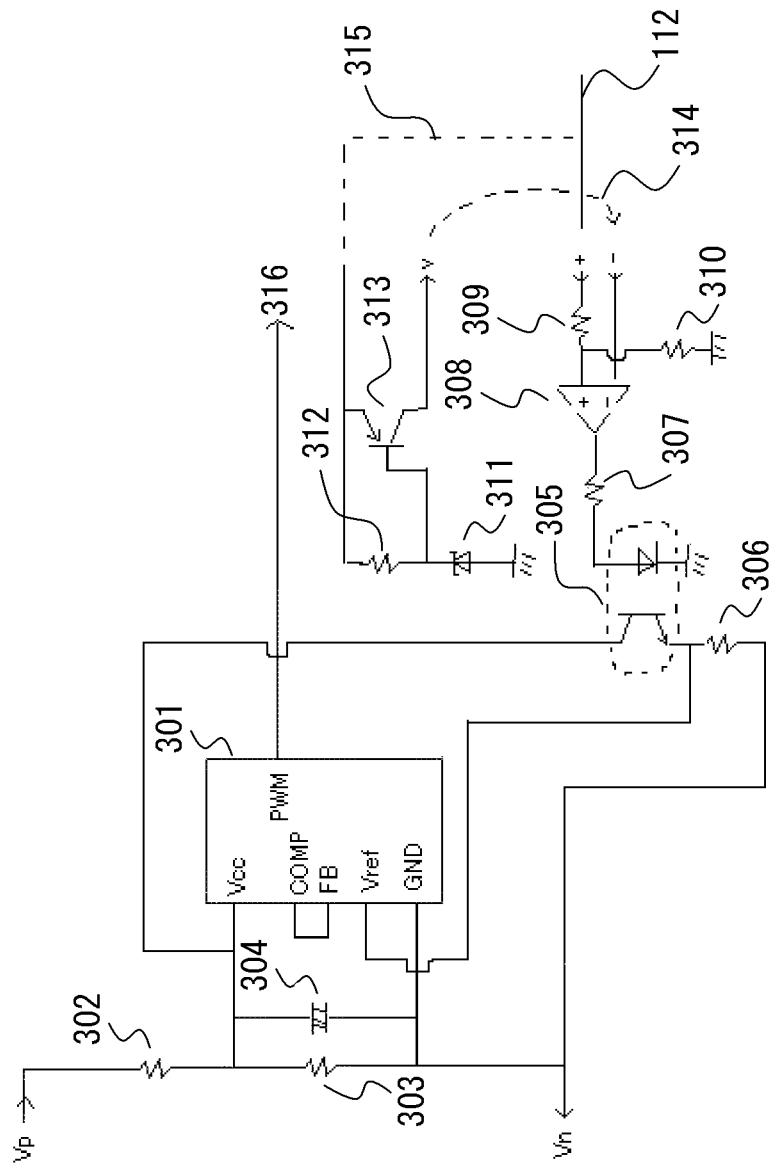
FIG. 3 is a detailed circuit configuration diagram of a constant voltage control circuit.

FIG. 3 is a detailed circuit configuration diagram of the constant voltage power supply control circuit 104 in FIG. 1. FIG. 3 illustrates an example in which the constant voltage power supply control circuit 104 is configured using a general-purpose PWM controller chip 301.

A photocoupler 305 is an NPN-type photocoupler element which isolates and delivers the feedback of the secondary-side DC output 112 in FIG. 1 to the primary side floated at AC 100V.

A comparator 308 is a comparator circuit which compares a Reference input voltage 314 and the output voltage of the secondary-side DC output 112 of the power supply circuit (AC adapter) in FIG. 1. A Zener diode 311 generates a constant voltage of the reference voltage v corresponding to the v terminal output of the constant voltage control circuit 104 in FIG. 1.

A PNP transistor 313 operates when the power is turned on, so that that the Reference input voltage 314 of the comparator 308 is constantly lower than a Feedback input voltage 315, and the output voltage continues to rise up to the stable point until the voltage of the Zener diode 311 stabilizes. That is, the output of the reference voltage v is temporarily masked.

Resistors 302 and 303 are voltage dividing circuits for making the voltage for Vp, Vn terminals, which is the input 101 of AC 100V in FIG. 1 rectified by the primary-side rectifying/smoothing circuit of the diode 102 and the capacitor 103, the VCC terminal voltage (DC 12V for example) of the PWM controller chip 301. A capacitor 304 is a smoothing capacitor for the divided voltage of the voltage dividing circuit. A resistor 306 turns the current of the output transistor that constitutes the photocoupler 305 into a voltage. A resistor 307 is a limiting resistor for limiting the current for the diode that constitutes the photocoupler 305. Resistors 309 and 310 are voltage dividing circuits for making the Feed back input voltage 315 be near the voltage of the reference voltage v. A resistor 312 supplies a bias current for maintaining the constant voltage of the Zener diode 311.

In the configuration described above, the PWM controller chip 301 is a general-purpose PWM controller of a fixed frequency (150 KHz for example). This chip outputs to the N-channel FET 108 in FIG. 1 a PWM waveform signal 316 which is directed towards a duty ratio of a wider pulse width when the input voltage from the photocoupler 305 to the Vref terminal is in a decreasing direction. Alternately, it outputs to the N-channel FET 108 a PWM waveform signal 316 which is directed towards a duty ratio of a narrower pulse width when the input voltage from the photocoupler 305 to the Vref terminal is in an increasing direction. As a result, the secondary-side DC output 112 of the power supply circuit in FIG. 1 tends to be high voltage when the input voltage for the Vref terminal is in a decreasing direction, and in contrast to be low voltage when it is in an increasing direction.

In the use of a general-purpose configuration, the Vref terminal has the reference voltage input and the FB terminal has the feedback input, and the input voltage of the FB terminal is compared with the input voltage of the Vref terminal by the comparator, and the result is output to the COMP terminal. In the present embodiment, the output of the photocoupler 305 is connected to the Vref terminal (+input) as a voltage follower connection of a simple gain=1, in which the FB terminal and the COMP terminal are shorted.

The output of the photocoupler 305 (the voltage of the resistor 306) is determined by the comparator 308 that has received the input of the Feed back input voltage 315 (+input). The Feed back input voltage 315 corresponds to the secondary-side DC output voltage 112. Then, when the Feed back input voltage 315 becomes high, the output voltage of the photocoupler 305 becomes high. In contrast, when the Feed back input voltage 315 becomes low, the output voltage of the photocoupler 305 becomes low. Here, this operation occurs near the Reference input voltage 314 of the comparator 308. For this reason, due to the effect of the negative feedback with which the input voltage for the Vref terminal of the PWM controller chip 301 is inverted, an adjustment is made into a state in which the voltages of the +terminal and the −terminal of the comparator 308 become equal (a state of an imaginary short). As a result, the output voltage of the comparator 308 becomes the input voltage of the Vref terminal. Accordingly, for the output voltage of the comparator 308, a voltage determined by the following relational expression is obtained.

(Value of the resistor 309)/(Value of the resistor 310)×Reference input voltage 314

Figure 4:
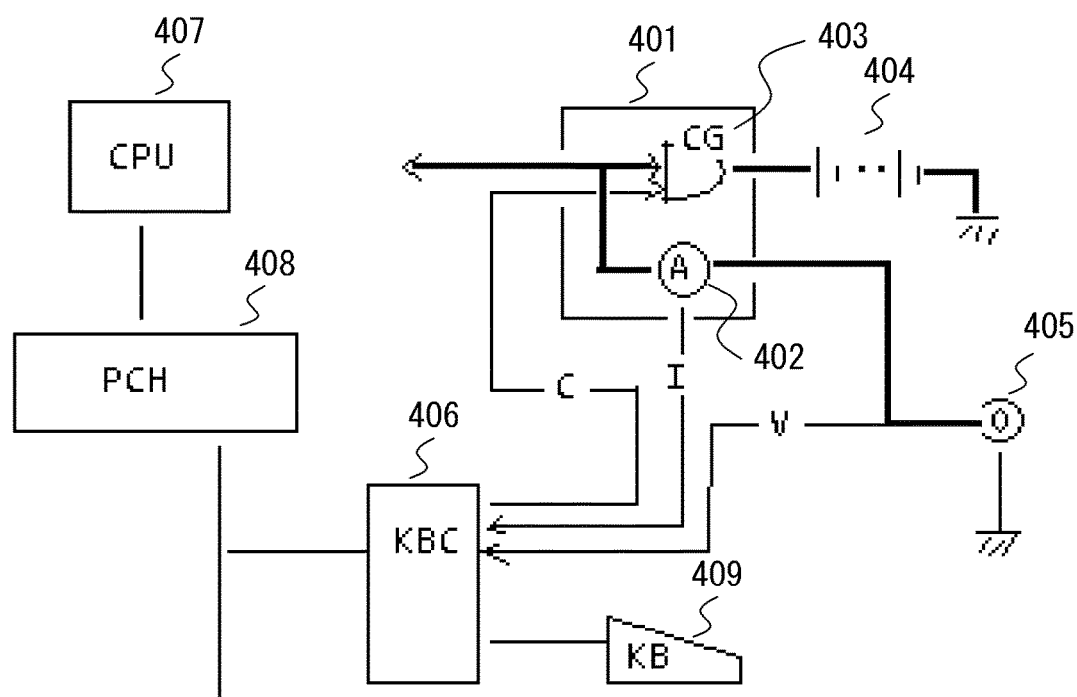
FIG. 4 is a detailed circuit configuration diagram of a power supply and charging circuit of a PC as an embodiment.

FIG. 4 is a detailed circuit configuration diagram of a power supply and charging circuit of a mobile personal computer (hereinafter, referred to as a "PC") as an embodiment which receives a power supply from the power supply circuit (AC adapter) in FIG. 1, which is the first embodiment.

The embodiment in FIG. 4 illustrates a case in which the PC that has received a report of the power supply capability by means of the output voltage from the AC adapter controls the power consumption according to the power supply quantity by changing the charging current quantity.

In FIG. 4, a CPU 407 is a central processing unit, and a PCH 408 is what is generally called a southbridge circuit of a chip set, which is a circuit that acts as an interface between the CPU 407 and various peripheral devices such as a hard disk. A keyboard controller (hereinafter, referred to as a "KBC") 406 is a chip including a microcontroller which serves various functions related to the overall system, as well as the input of an keyboard (KB) connected to it.

The KBC 406 illustrated in the embodiment has power supply control functions (functions of a power supply voltage detecting circuit, a current consumption quantity detecting circuit, and a constant current control circuit). The KBC 406 monitors whether the AC adapter is connected and monitors the power supply capability of the AC adapter as the input voltage V of a DC (Direct Current) input 405. When the AC adapter is connected, the KBC 406 monitors a current detection voltage I corresponding to the current consumption i, to control a charging quantity control voltage C so that the current consumption stays within the power supply capability that has been reported from the AC adapter. In other words, the KBC 406 operates according to the charging method of differential charging.

In FIG. 4, a charging control circuit 401 is equipped with a current detecting circuit 402 (A) and a charging circuit 403 (CG). The current detecting circuit 402 (corresponding to part of the current consumption quantity detecting circuit) outputs the current detection voltage I corresponding to the current consumption i. The charging circuit 403 receives an instruction for the charging quantity control voltage C from the KBC 406 and adjusts the charging constant current for a secondary battery 404. The KBC 406 and the charging circuit 403 are able to constitute the constant current control circuit.

Figure 5:
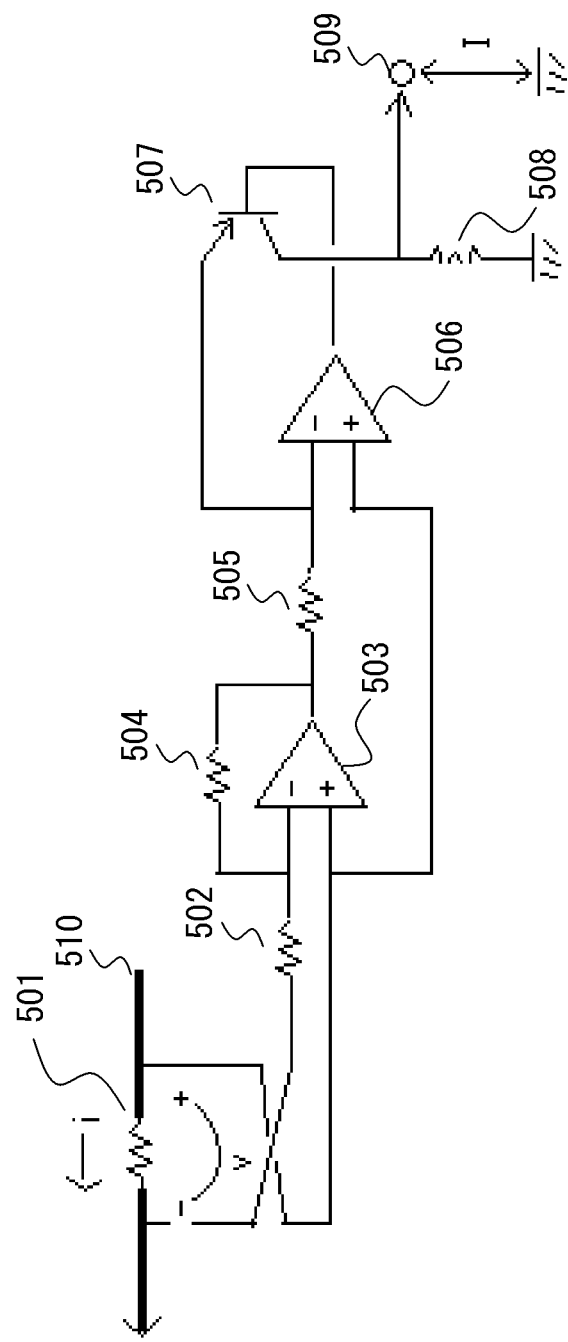
FIG. 5 is a detailed circuit configuration diagram of a current detecting circuit.

FIG. 5 is a detailed circuit configuration diagram of the current detecting circuit 402.

An operational amplifier 503 constitutes the voltage amplifier, and an operational amplifier 506 constitutes a level shift circuit. A voltage sense resistor 501 detects the current of a power supply line 510.

When the current consumption i flows in the power supply line 510, a voltage v is generated at the two ends of the voltage sense resistor 501. The voltage amplifier configured around the operational amplifier 503 amplifies the voltage v to the detection voltage level multiplied by n=(Value of the resistor 504)/(Value of the resistor 502), which makes it possible to detect the voltage v.

An offset of the power supply voltage of the power supply line 510 is provided to the detection voltage. The level shift circuit configured around the operational amplifier 506 is a circuit for performing a level shift of the v×n-fold voltage to an appropriate voltage with respect to the ground. The operational amplifier 506 also operates as the reference with the voltage v at one end of the voltage sense resistor 501, which is similar to that for the operational amplifier 503. In this case, the output voltage of the operational amplifier 503 provided to the operational amplifier 506 through the register 505 is imaginary-shorted by a feedback of the output of the operational amplifier 506 via a PNP transistor 507. As a result, an automatic adjustment is made so that the current flowing in the resistor 505 and the current flowing in the emitter of the PNP transistor 507 become equal. The emitter current of the PNP transistor 507 flows in the resistor 508 almost without change via its collector and generates the current detection voltage I corresponding to the current consumption i in an output terminal 509 connected to the resistor 508. From the current detection voltage I, the component of the power supply voltage of the power supply line 510 with respect to the ground is removed, since one end of the resistor 508 is connected to the ground. As a result, when the current consumption i is 0A, the current detection voltage I=0V, and the current detection voltage I becomes a voltage corresponding to the current consumption i.

The operation in the embodiment in FIG. 5 is explained more specifically.

Assuming the resistance value of the resistor 501 as R, the contact point voltage of its right end (the potential from the ground) as $v_+$ and the contact point voltage of its left as $v_-$, the branch voltage υ applied to R is as follows.

$$v = v_+ - v_- = R_i$$

When the operational amplifier 503 is ideal, that is, when the input impedance is infinite (∞) and an open gain A is ∞, the voltages of the −terminal and the +terminal are equal, and the current entering the +terminal and the −terminal is 0. The current $I_{502}$ of The resistor $R_{502}$ becomes as follows.

$$\frac{v_- - v_+}{R_{502}}$$

The current $I_{504}$ of the resistor $R_{504}$ becomes as follows. Here, $v_{503}$ is an output voltage of the operational amplifier 503, which becomes as follows.

$$I_{504} = \frac{v + v_{503}}{R_{504}} - \frac{v_- - v_+}{R_{502}} + \frac{v_+ - v_{503}}{R_{504}} = 0$$

As a result, the following is obtained.

$$\frac{R_{504}(v_+ - v_-) + R_{502}(v_+ - v_{503})}{R_{504} \cdot R_{502}} = 0$$

$$R_{504} + R_{502})v_+ - R_{504}v_- - R_{502}v_{503} = 0$$

$$R_{502} \cdot v_{503} = (R_{504} + R_{502})v_+ - R_{504}v_- = R_{504}(v_+ - v_-) + R_{502}v_+$$

Therefore, $v_{503}$ is determined as follows.

$$v_{503} = \frac{R_{504}}{R_{502}} \cdot v + v_+ \tag{1}$$

Meanwhile, when the operational amplifier 506 is also ideal, the voltages in the +terminal and the −terminal are equal, and the current flowing in the resistor $R_{505}$, that is, the emitter current $I_e$ of the PNP transistor 507 becomes as follows, when it flows.

$$I_e = \frac{v_{503} - v_+}{R_{505}}$$

Here, an analysis for $I_e$ to flow is conducted. First, assuming that the operational amplifier 506 is non-ideal and assuming the open gain as A, $v_{506}$ becomes as follows.

$$v_{506} = A(v_+ - v_-')$$

Here, $v_-'$ is the voltage of the −terminal. Further, the next expression is established.

$$v_{506} = v_{506}' + v_{EB}$$

Here, $v_+'$ is a voltage of the +terminal, and $v_{EB}$ is the voltage between the emitter and the base of the PNP transistor 507, which is about 0.7 volts.

Therefore, the expression becomes as follows.

$$v_{506} = A\{v_+ - (v_{506} + v_{EB})\}$$

Assuming that the operational amplifier 506 is ideal, A=∞ (infinity), and therefore, the expression becomes as follows.

$$v_+ - (v_{506} + v_{EB}) = 0$$

$$v_{506} = v_+ - v_{EB}$$

That is, when the operational amplifier 506 is ideal, the voltage of the base terminal of the PNP transistor 507 becomes a voltage shifted from the voltage $v_+$ by the voltage $V_{EB}$ between the emitter and the base, and the emitter current $I_e$ is controlled as in the following expression.

$$I_e = \frac{v_{503} - v_+}{R_{505}}$$

The corrector current $I_c$ of the PNP transistor 507 is multiplied by α (about 0.99), and therefore, it is obtained as in the following expression.

$$I_c = \alpha \cdot \frac{v_{503} - v_+}{R_{505}}$$

Therefore, the potential of the output terminal 509 $V_{509}$ becomes the following expression.

$$v_{509} = \frac{\alpha(v_{503} - v_+)}{R_{505}} \cdot R_{508} \quad (2)$$

Substituting the expression (1) into the expression (2), the expression becomes as follows.

$$v_{509} = \frac{\alpha \cdot R_{508} \left\{ \left( \frac{R_{504}}{R_{502}} \cdot v + v_+ \right) - v_+ \right\}}{R_{505}}$$

$$= \frac{\alpha \cdot R_{508} \cdot \frac{R_{504}}{R_{502}} \cdot v}{R_{505}}$$

$$= \frac{\alpha \cdot R_{508} \cdot R_{504}}{R_{505} \cdot R_{502}} \cdot v$$

Therefore, the current detection voltage I is obtained as the following expression.

$$I = \frac{\alpha \cdot R_{508} \cdot R_{504}}{R_{505} \cdot R_{502}} \cdot R_{501} \cdot i$$

In the embodiment in FIG. 4, the KBC 406 monitors the power supply voltage according to the input voltage V of the DC input 405, and performs control by giving an instruction for the charging quantity control voltage C to the charging circuit 403, such that the current consumption i (current detection voltage I) which is determined in accordance with the input voltage V matches the consumable power.

FIG. 6 is a detailed circuit configuration diagram of the charging circuit 403 in FIG. 4.

The circuit is a constant current circuit which receives an instruction by means of the input voltage of the charging quantity control voltage C to an input terminal 601 from the KBC 406 and which charges the secondary battery 404 (FIG. 4).

A silicon diode 602 offsets the offset of Vbe (the voltage between the base and the emitter) of an NPN transistor 603. A resistor 605 is a bias resistor for keeping the silicon diode 602 in the ON state. The NPN transistor 603 and a resistor 604 constitute an emitter follower circuit. Accordingly, the emitter voltage of the NPN transistor 603 is automatically adjusted to be approximately the same voltage as the charging quantity control voltage C, and a control current ip flows in the resistor 604. The control current ip continues to flow via the collector of the NPN transistor 603 and generates a voltage in a resistor 606.

A PNP transistor 607 and a resistor 608 are also an emitter follower circuit. Accordingly, the voltage of the emitter of the PNP transistor 607 is automatically adjusted to be approximately equal to the voltage of the resistor 606. As a result, a current iC flows in the resistor 608, and the current iC is supplied as a charging output current to the secondary battery 404 (FIG. 4) via the collector of the PNP transistor 607.

The current iC is determined by the voltage of the resistor 606 and the resistor 608, regardless of the equivalent impedance of the secondary battery 404 (FIG. 4), and therefore, it works as a constant current source. Here, the voltage of the resistor 606 is determined by the control current ip that is determined by the input voltage of the charging quantity control voltage C and the resistor 604. That is, the circuit in FIG. 6 works as a constant current charging circuit whose charging output current iC is determined by the charging quantity control voltage C provided from the KBC 406 and the resistor 604.

As described above, the charging quantity control voltage C is controlled such that the current consumption i becomes a value corresponding to the power supply voltage V. Consequently, the charging output current iC flowing in the secondary battery 404 (FIG. 4) is controlled to be a value corresponding to the power supply voltage V reported from the power supply circuit in FIG. 4, and the power consumption is controlled.

Figure 7:
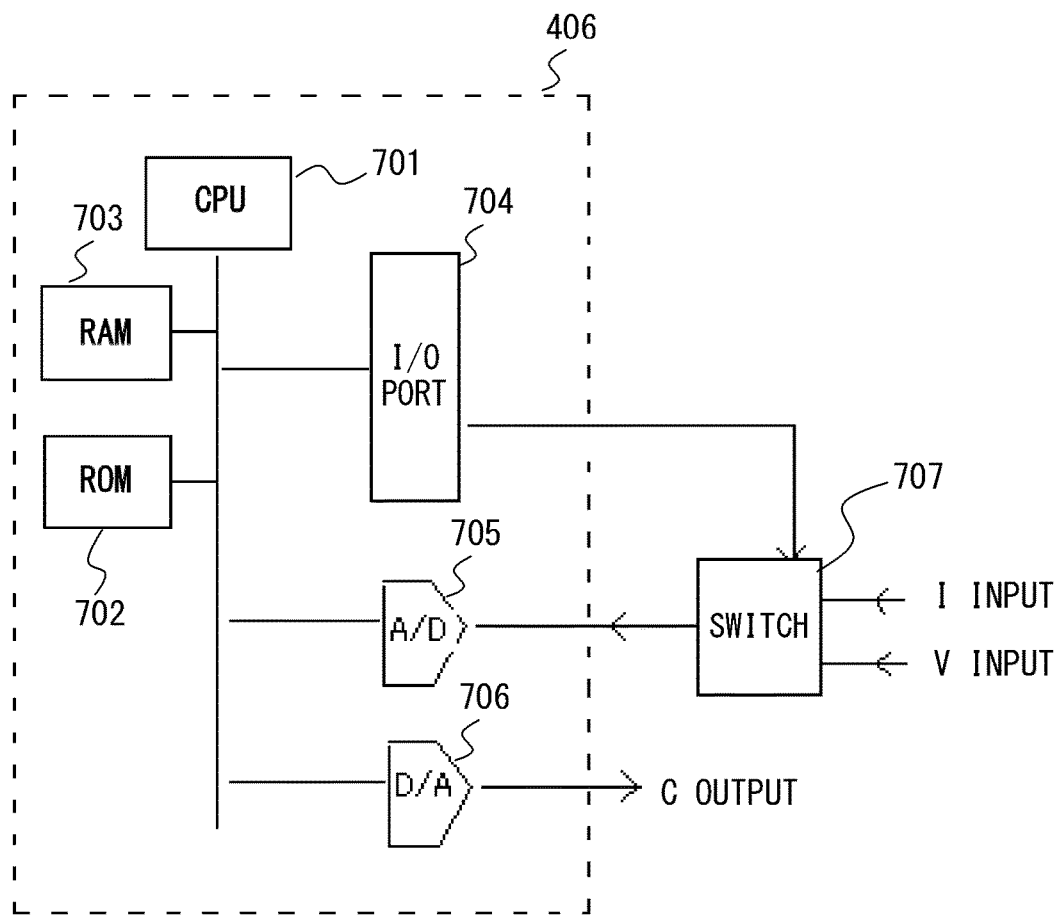
FIG. 7 is a circuit block configuration diagram of a keyboard controller and its surroundings.

FIG. 7 is a block configuration diagram of the KBC 406 which has a function as described above of detecting the current consumption i corresponding to the power supply voltage V supplied from the AC adapter circuit in FIG. 1 and of keeping it within the rated current, in the configuration of the embodiment of the PC in FIG. 4, as well as the surrounding circuits. Meanwhile, the configuration in FIG. 7 is an example of an embodiment of the KBC 406, and it is not limited to any particular implementation method.

A CPU 701 is a central processing unit provided inside the KBC 406, a ROM 702 is a read-only memory which stores a control program for executing the control operation illustrated in the flowchart in FIG. 8 described later, and a RAM 703 is a work memory. Meanwhile, an I/O port 704 is a register group that provides an interface between the I/O pin and the internal bus. An A/D (analog/digital) converter 705 has an input of an analog value of the power supply voltage V in the DC input 405 in FIG. 4 or the current detection voltage I detected by the current detecting circuit 402 in FIG. 4, and converts each into a digital value. A D/A (digital-analog) converter 706 converts the digital value of the charging quantity control voltage C into an analog value and supplies it to the charging circuit 403 in FIG. 4. A switch 707 is an analog switch for changing the input of the power supply voltage V and the input of the current detection voltage I. The switch 707 receives an instruction from the output pin connected to the I/O port 704, selects the input of the power supply voltage V or the current detection voltage I, and gives it to the input pin of the A/D converter 705. The input value of the power supply voltage V and the current detection voltage I is evaluated by a control program for executing the control operation illustrated in the flowchart in FIG. 8 described later executed by the CPU 701. An output instruction for the charting quantity control voltage value determined as a result is provided to the D/A converter 706, and the charging quantity control voltage C is output from the D/A converter 706.

Figure 8:
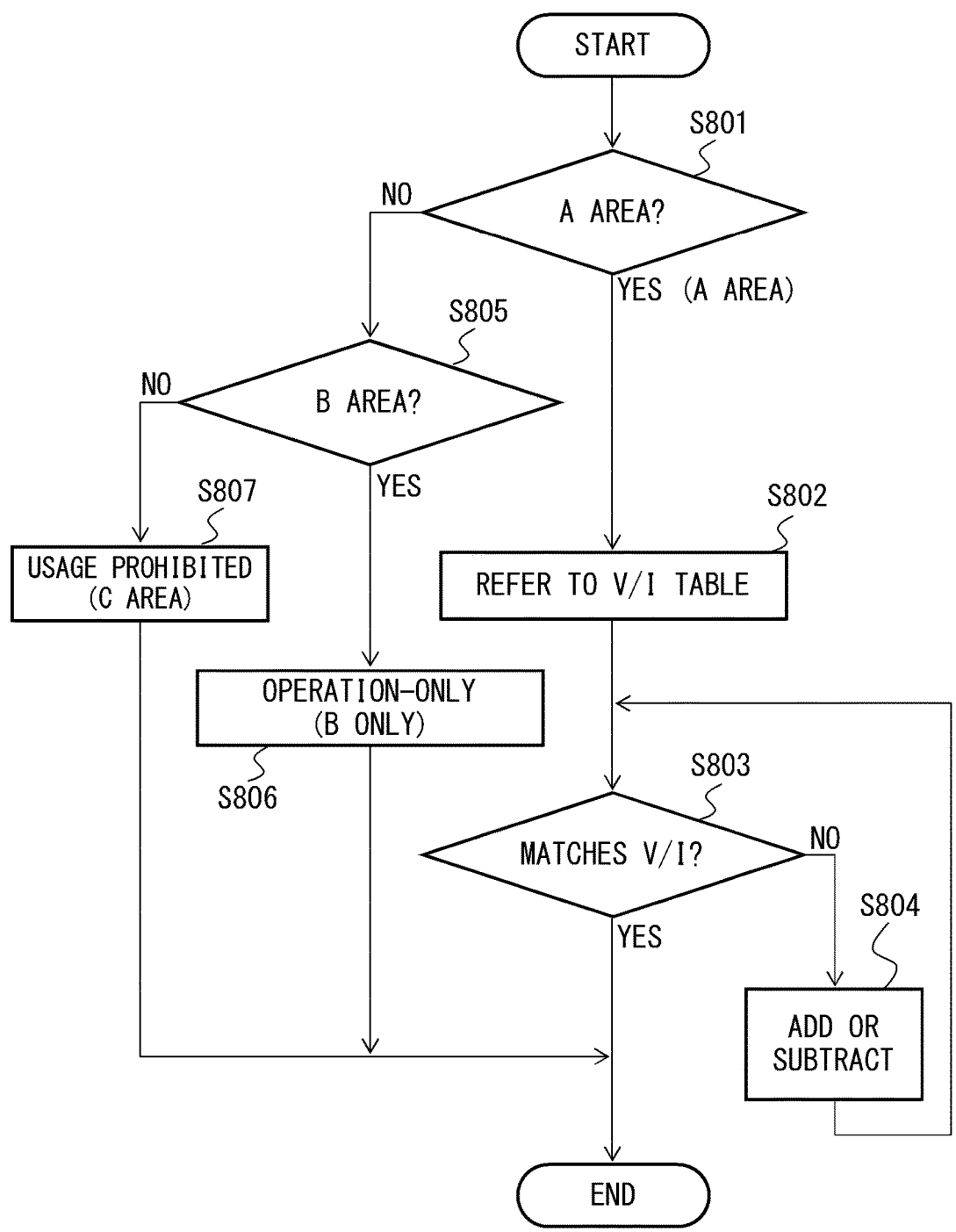
FIG. 8 is a flowchart illustrating a control operation example for a keyboard controller according to an embodiment.

FIG. 8 is a flowchart illustrating the control operation of a control program read from the ROM 702 and executed by the CPU 701 in FIG. 7 in the KBC 406 in FIG. 4. The flowchart illustrates the control operation executed at the PC side when the output-available power is reported by means of a change in the power supply voltage V output by the AC adapter in FIG. 1 illustrated in FIG. 2. Meanwhile, FIG. 9 presents a data configuration example of a V/I table (that may constitute a voltage/current table) stored in the ROM 702 to which the CPU 701 refers when executing the control program. The V/I table stores the correspondence relationship between the power supply voltage V and the current consumption quantity i and the availability/unavailability of charging.

In the PC, according to the power supply voltage that is input to the DC input 405 in FIG. 4, the area of the power consumption indicating the availability/unavailability of charging is set to one of a charging-available area A, an operation-only (charging unavailable) area B, and an unusable area C, as illustrated in FIG. 2.

The control operation in the flowchart in FIG. 8 is repeatedly executed at fixed time intervals.

First, the CPU 701 in FIG. 7 in the KBC 406 in FIG. 4 monitors the power supply voltage V, and according to its value, refers to the V/I table that has the data configuration example presented in FIG. 9 and that is stored in the ROM 702 according to the capability of the AC adapter connected to the DC input 405. Then, the area of the power consumption is determined as described below.

First, the CPU 701 in FIG. 7 controls the switch 707 from the I/O port 704 and obtains the power supply voltage V in the DC input 405 in FIG. 4 via the A/D converter 705.

The CPU 701 judges whether or not the power supply voltage V is a voltage value corresponding to the A area on the V/I table presented in FIG. 9 (FIG. 8, step S801).

When the power supply voltage V is the voltage value of the A area and the judgment in step S801 is YES, next, the CPU 701 controls the switch 707 from the I/O port 704 to obtain the current detection voltage I detected by the current detecting circuit 402 in FIG. 4 via the A/D converter 705. Then, the CPU 701 reads the value of the current consumption i from the entry corresponding to the power supply voltage V on the V/I table presented in FIG. 9 (the above is step S802 in FIG. 8).

The CPU 701 judges whether the current detection value corresponding to the current detection voltage I obtained in step S802 matches the value of the current consumption i read from the V/I table in step S802 corresponding to the current power supply voltage V (FIG. 8, step S803).

When the current detection value and the value of the current consumption i read from the V/I table match and the judgment in step S803 is YES, the currently output charging quantity control voltage C may be maintained without change, and therefore, the operation in the flowchart in FIG. 8 is terminated.

When the current detection value and the value of the current consumption i do not match and the judgment in step S803 is NO, according to the relative magnitude of the current detection value and the value of the current consumption i, the CPU 701 adds a fixed value to or subtracts a fixed value from the charging quantity control voltage C (FIG. 8, step S804). That is, when the current detection value corresponding to the current detection voltage I is smaller than the value of the current consumption i, a fixed value is added to the value of the charging quantity control voltage C so that the current detection value gradually increases and becomes closer to the value of the current consumption i. In contrast, when the current detection value corresponding to the current detection voltage I is larger than the value of the current consumption i, a fixed value is subtracted from the value of the charging quantity control voltage C so that the current detection value gradually decreases and becomes closer to the value of the current consumption i. After that, the process returns to the judgment in step S803.

When the power supply voltage V does not have a voltage value of the A area and the judgment in step S801 is NO, the CPU 701 judges whether the power supply voltage V is a voltage value corresponding to the area B on the V/I table presented in FIG. 9 (FIG. 8, step S805).

When the power supply voltage V has a voltage value of the B area and the judgment in step S805 is YES, next, the CPU 701 makes the charging quantity control voltage C zero so as to disable charging and to allow only the operation of the PC (FIG. 8, step S806). As a result, the charging quantity control voltage C is no longer supplied from the KBC 406 in FIG. 4 to the charging circuit 403, and in the charging circuit 403 in FIG. 6, the charging output current iC supplied to the secondary battery 404 in FIG. 4 becomes zero, and the charging stops. Meanwhile, the power supply to the PC main body side is continued from the DC input 405 in FIG. 4 via the current detecting circuit 402. After that, the operation in the flowchart in FIG. 8 is terminated.

As described above, in the present embodiment, when the temperature of the power supply circuit in FIG. 1 (AC adapter) rises from 35° C. to 40° C. and the power supply voltage V supplied from it decreases to the level of the B area (see FIG. 2), power consumption control is performed as follows in the PC in FIG. 4. In the charging control circuit 401 in FIG. 4, charging of the secondary battery 404 from the charging circuit 403 is not performed, and only the power supply to the main body is performed.

When the power supply voltage V does not have a voltage value of the B area and the judgment in step S805 is NO, the CPU 701 judges that the power supply voltage V is in the C area (15 volts or below). In this case, the CPU 701 activates a circuit (not illustrated in the drawing) for stopping the operation of the entirety of the charging control circuit 401 in FIG. 4, in order to completely prohibit the use of the PC (FIG. 8, step S807). As a result, the operation of the entirety of the PC stops.

As described above, in the present embodiment, when the temperature of the power supply circuit in FIG. 1 (AC adapter) rises to or above 40° C. and the power supply voltage V supplied from it decreases to the level of C area (see FIG. 2), power consumption control to stop the power supply to the entirety of the PC is performed for safety.

The installation environment which becomes the determining factor of the power supply capability in the power supply circuit is not limited only to the environmental temperature presented in the first embodiment in FIG. 1, and it is also possible to make it dependent on the input voltage of the AC power. The demand for reduction in power usage is not limited to times of disaster such as the Great East Japan Earthquake, and power shortages in summer have become permanent things in countries of the world. This trend is the same as the market principle wherein there is a demand first and supply follows it, a permanent principle that continues as long as humanity exists.

A common practice generally taken as a countermeasure against power shortages is to decrease the power supply voltage within an allowable range, but the effect of this is weakening because devices that operate without depending on the power supply voltage have increased along with the advancement of core technologies of electrical devices, and even when the power supply voltage is decreased, the current increases. In particular in recent times, the introduction of LED (Light Emitting Diode) lighting has made progress, and its power consumption has almost no dependence on the input voltage of the power supply, because it is designed so as to maintain a constant brightness in a broad range of the input voltages.

According to the embodiment, it becomes possible to receive an input voltage as a power consumption reduction message and to restrict operations depending on it, for example as a control of the brightness of LED illumination performed with a decrease in the input voltage as the trigger, and it becomes possible to respond to the demand for power reduction.

Figure 10:
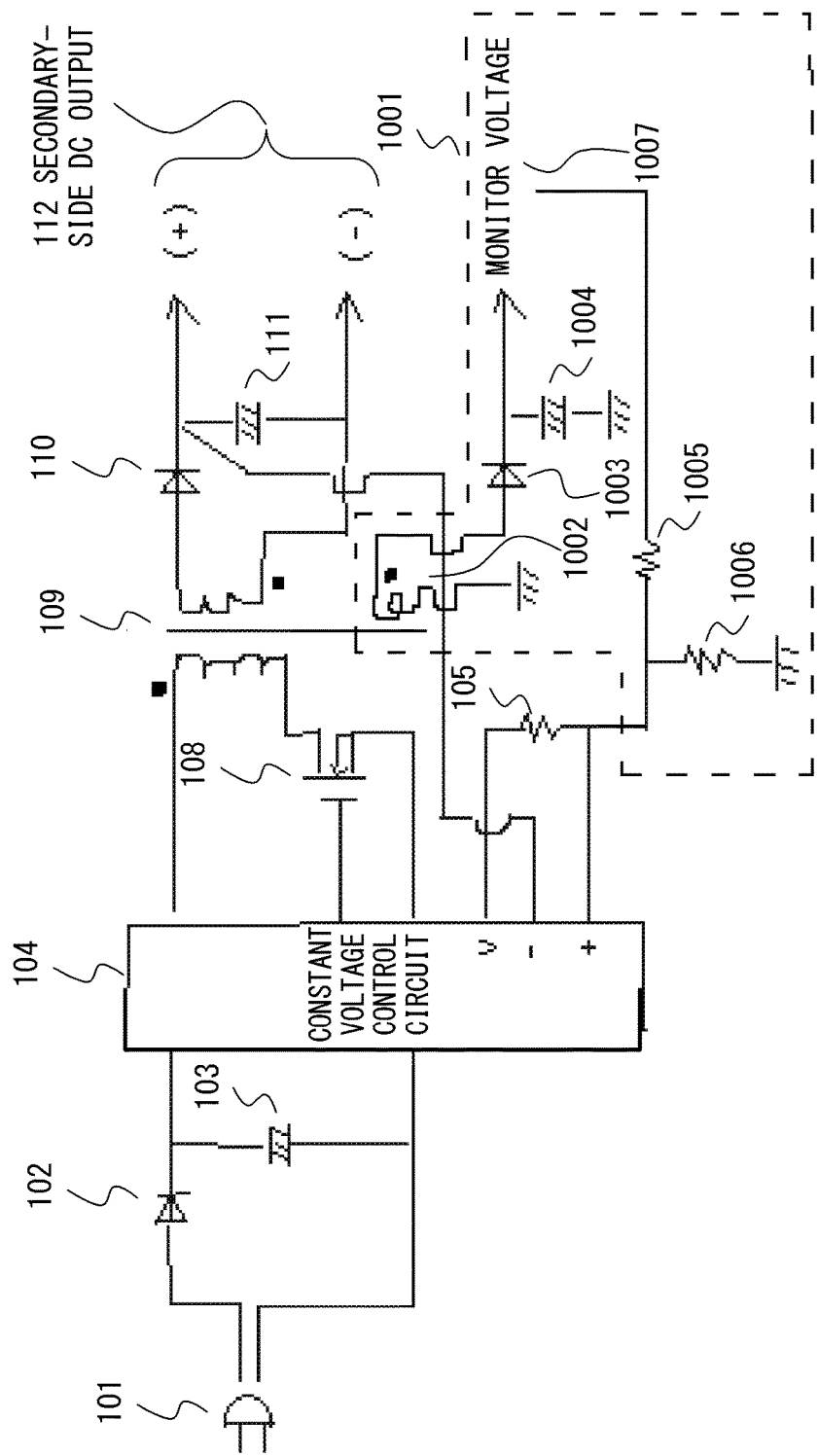
FIG. 10 is a configuration diagram of a second embodiment of a power supply circuit.

FIG. 10 is a configuration diagram of a second embodiment of a power supply circuit. The second embodiment illustrates the circuit configuration of an AC adapter in which a fluctuation in the input voltage of AC 100V is detected and the output voltage is changed in a manner linked to it.

In the configuration of the second embodiment in FIG. 10, the same reference numerals are assigned to the portions which have the same functions as in the case of the first embodiment in FIG. 1.

The configuration in FIG. 10 differs from the configuration in FIG. 1 in that, instead of the temperature monitoring circuit 113 in FIG. 1, a power supply voltage monitor circuit 1001 (corresponding to the environment detecting circuit) is provided.

The power supply voltage monitor circuit 1001 is equipped with a voltage detecting winding 1002 in the flyback transformer 109 and obtains a monitor voltage 1007 by rectifying and smoothing the voltage output from the voltage detecting winding by a diode 1003 and a capacitor 1004. According to the monitor voltage 1007, an offset is applied to a reference voltage v supplied from the constant voltage control circuit 104 through the voltage dividing resistor 105, to change the output voltage of the secondary-side DC output 112.

The voltage dividing resistor 105 and a resistor 1005 are resistors for making the voltage source of the reference voltage v and the monitor voltage V the current source, and they let a current flow in a register 1006, and the voltage generated in the register 1006 by this current is provided to the +input terminal of the constant voltage control circuit 104 as the reference voltage.

The voltage of the reference voltage v is constant, and therefore, the current flowing in the resistor 1006 from it is constant (ignoring the cross talk of the monitor voltage), and the voltage change in the resistor 1006 depends on the current of the monitor voltage. Accordingly, the secondary-side DC output 112 changes in reflection of the monitor voltage 1007.

Figure 11:
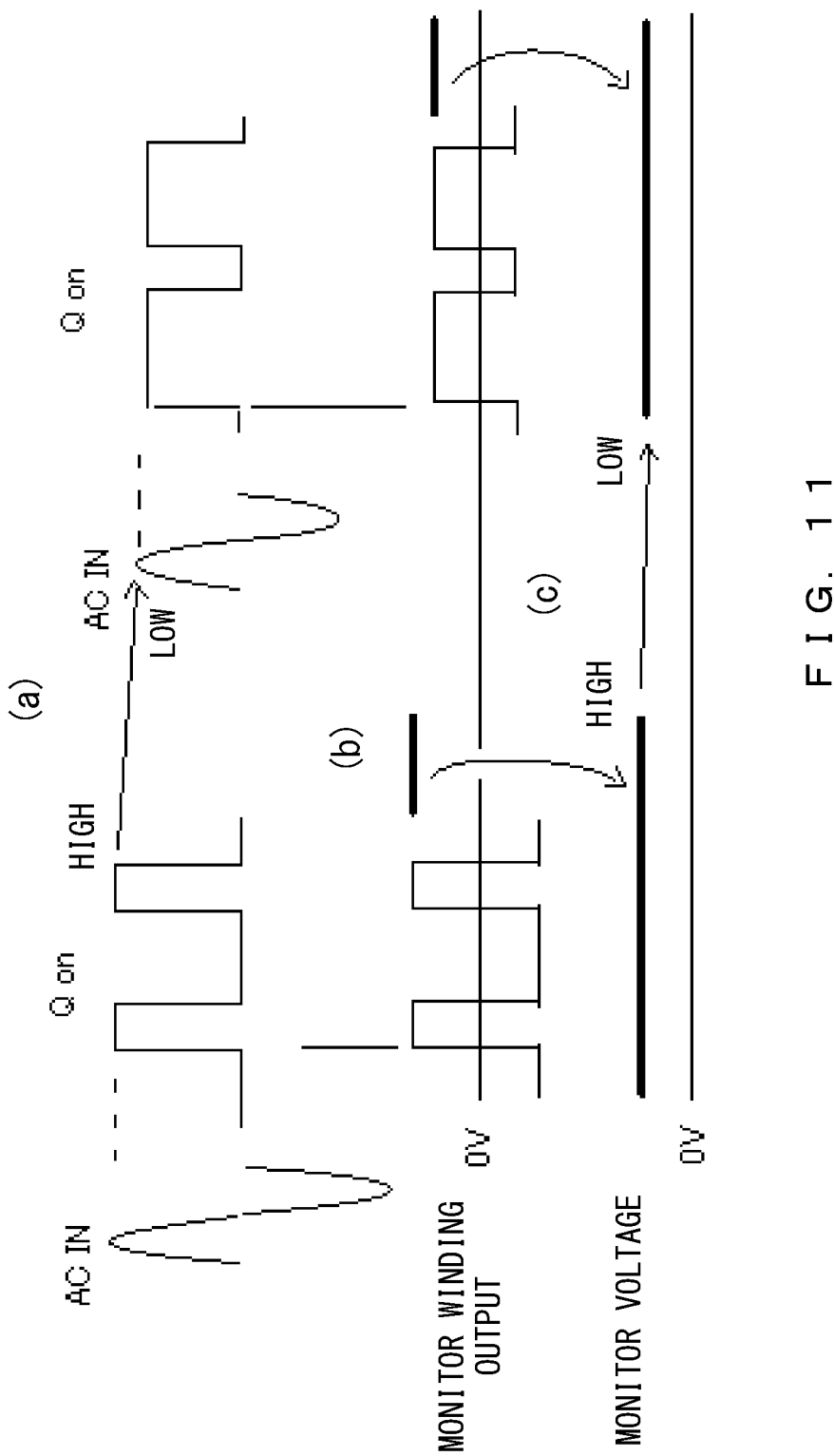
FIG. 11 is an operation characteristic diagram of the second embodiment.

FIG. 11 is an operation characteristic diagram of the second embodiment of the power supply circuit that has the configuration in FIG. 10.

The input voltage of AC (indicated as "AC IN" in the drawing) is rectified and smoothed, and it is provided as a pulse voltage (indicated in the drawing as "Qon") from the N-channel FET 108 to the flyback transformer 109 in FIG. 10, which is illustrated in FIG. 11 (a).

The value of the voltage is reflected in the output voltage of the voltage detecting winding 1002, which is provided with the same polarity as that of the primary winding side of the flyback transformer 109, and the way in which this voltage is output is illustrated in FIG. 11 (b). This example presents an example of a voltage control by means of a fixed period PWM, and illustrates the way in which the ON period of the N-channel FET 108 expands when the input voltage of AC IN becomes low and narrows when it becomes high.

Then, the output voltage of the voltage detecting winding 1002 is rectified and smoothed, and the monitor voltage 1007 which reflects the input change in AC IN is obtained.

According to the respective embodiments described above, by having a mechanism to report and supply an output power according to the installation environment, it becomes possible for the device receiving the output power to perform consumption corresponding to it, and to use a limited power in a cooperative manner. In addition, the cooling structure for a power supply device may be simplified, which enables a smaller size, expands the range of parts that may be used, and realizes a low cost. Furthermore, it becomes possible to share an AC adapter between devices that receive power and that have different consumption levels, while maintaining compatibility with a conventional AC adapter.

In the respective embodiments described above, an example of a charging current with which it is easy to adjust the power demand according to the supply capability of the AC adapter is used to simplify the explanation, but it is obvious that the present invention may also be applied to a control of the power consumption of the entirety of the system, and the present invention is not limited to these functions for which power is to be limited.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A power supply circuit comprising:
an environment detecting circuit which detects an installation environment; and
a voltage control circuit which makes a report of a power supply capability by performing fluctuation control of an output voltage in response to detection information of the environment detecting circuit,
wherein the voltage control circuit
includes a constant voltage control circuit which performs control such that a constant voltage corresponding to a controlled reference voltage (+) is output as the output voltage, and
determines the controlled reference voltage (+) according to the detection information.

2. The power supply circuit according to claim 1, wherein the installation environment is a temperature environment, and the detection information is a temperature detection voltage corresponding to a temperature of the temperature environment.

3. The power supply circuit according to claim 1, wherein the environment detecting circuit,
is equipped with a voltage dividing resistor which is connected to a power supply of a prescribed reference voltage (v); and
is equipped with a temperature monitoring circuit constituted by parallel connection of a thermistor which has a negative temperature characteristic and a Zener diode, being connected in series to the voltage dividing resistor,
provides a voltage at a connection part of the voltage dividing resistor and the temperature monitoring circuit to the constant voltage control circuit as the controlled reference voltage (+);
when an environmental temperature is kept low compared with a prescribed temperature boundary, outputs a fixed voltage clamped by a voltage of the Zener diode as the controlled reference voltage (+); and
when the environmental temperature rises to a high temperature compared with the prescribed temperature boundary, outputs a voltage obtained by dividing the prescribed reference voltage (v) by the voltage dividing resistor and the thermistor as the controlled reference voltage (+).

4. The power supply circuit according to claim 1, wherein the environment detecting circuit is equipped with
an output voltage monitor circuit which monitors the output voltage;
first and second resistors which are connected in series between a power supply of a prescribed reference voltage (v) and a ground; and
a third resistor which supplies to a connection part of the first and second resistors with a monitor voltage output by the output voltage monitor circuit, wherein the environment detecting circuit
provides a voltage at the connection part of the first and second resistors that changes according to the monitor voltage to the constant voltage control circuit as the controlled reference voltage (+).

5. The power supply circuit according to claim 1, wherein the installation environment is an alternative current (AC) input voltage and the detection information is an AC input voltage detection voltage corresponding to the AC input voltage.

6. The power supply circuit according to claim 1, wherein a report of a power supply capability made by performing fluctuation control of the output voltage is made by performing fluctuation control of a power supply voltage.

7. An electronic processing apparatus which receives a report of a power supply capability made by performing fluctuation control of a power supply voltage, comprising:
a power supply voltage detecting circuit which detects the power supply voltage (V);
a current consumption quantity detecting circuit which detects a current consumption quantity (i); and
a constant current control circuit which performs constant current control such that the current consumption quantity (i) detected by the current consumption quantity detecting circuit becomes a current quantity corresponding to the power supply voltage (V) detected by the power supply voltage detecting circuit.

8. The electronic processing apparatus according to claim 7, wherein
the constant current control circuit controls whether or not to perform power supply to a main body of the electronic processing apparatus, whether or not to perform charging of a built-in battery, and a charging current quantity at the time of charging.

9. The electronic processing apparatus according to claim 8, wherein
the constant current control circuit
stores a correspondence relationship of a power supply voltage (V) and a current consumption quantity (i) and an availability/unavailability of charging as a voltage/current table;
obtains the current consumption quantity (i) and the availability/unavailability of charging (A area, B area, C area) corresponding to the power supply voltage (V) detected by the power supply voltage detecting circuit by referring to the voltage/current table according to the power supply voltage (V) detected by the power supply voltage detecting circuit;
when the obtained availability/unavailability of charging indicates a charging available area (A area), performs charging of the built-in battery, and also performs constant current control such that the current consumption quantity (i) detected by the current consumption quantity detecting circuit becomes a current quantity corresponding to the power supply voltage (V) detected by the power supply voltage detecting circuit;
when the obtained availability/unavailability of charging indicates an operation-only area (B area), stops charging of the built-in battery, and continues power supply to a main body of the electronic processing apparatus; and
when the obtained availability/unavailability of charging indicates an unusable area (C area), stops charging of the built-in battery and power supply to the main body of the electronic processing apparatus.

10. A power supply method comprising:
detecting an installation environment;
making a report of a power supply capability by performing fluctuation control of an output voltage in response to detection information of the installation environment; and
receiving the report of the power supply capability and controlling power consumption,
wherein
the report of a power supply capability made by performing fluctuation control of the output voltage is made by performing fluctuation control of a power supply voltage;
the power supply voltage is detected;
a current consumption quantity is detected; and
constant current control is performed such that the detected current consumption quantity becomes a current quantity corresponding to the detected power supply voltage.

11. The power supply method according to claim 10, wherein
in the constant current control, whether or not to perform power supply to a main body of the electronic processing apparatus, whether or not to perform charging of a built-in battery, and a charging current quantity at the time of charging are controlled.

12. The power supply method according to claim 11, wherein
in the constant current control,
a correspondence relationship of a power supply voltage and a current consumption quantity and an availability/unavailability of charging is stored as a voltage/current table;
a current consumption quantity and an availability/unavailability of charging corresponding to the detected power supply voltage is obtained by referring to the voltage/current table according to the detected power supply voltage;
when the obtained availability/unavailability of charging indicates a charging available area, charging of the built-in battery is performed, and also constant current control is performed such that the detected current consumption quantity becomes a current quantity corresponding to the detected power supply voltage;
when the obtained availability/unavailability of charging indicates an operation-only area, charging of the built-in battery is stopped, and a power supply to a main body of an electronic processing apparatus is continued; and
when the obtained availability/unavailability of charging indicates an unusable area, charging of the built-in battery and power supply to the main body of the electronic processing apparatus are stopped.

* * * * *